US012585734B2

(12) United States Patent (10) Patent No.: US 12,585,734 B2
Sandow et al. (45) Date of Patent: Mar. 24, 2026

(54) 3-D PROSTHETIC OR OBJECT MODEL FILE SECURE ENCAPSULATION IN A NON-DISTRIBUTABLE IMAGE RENDERING FILE FORMAT

(71) Applicant: MACROPACE PRODUCTS PTY LTD, Eastwood (AU)

(72) Inventors: Michael John Sandow, Eastwood (AU); Sam Papas, Eastwood (AU)

(73) Assignee: MACROPACE PRODUCTS PTY LTD, Eastwood (AU)

( * ) Notice: Subject to any disclaimer, the term of this patent is extended or adjusted under 35 U.S.C. 154(b) by 20 days.

(21) Appl. No.: 18/713,283

(22) PCT Filed: Nov. 25, 2022

(86) PCT No.: PCT/AU2022/051413
§ 371 (c)(1),
(2) Date: May 24, 2024

(87) PCT Pub. No.: WO2023/092186
PCT Pub. Date: Jun. 1, 2023

(65) Prior Publication Data
US 2025/0028844 A1 Jan. 23, 2025

(30) Foreign Application Priority Data

Nov. 25, 2021 (AU) ................................. 2021903803

(51) Int. Cl.
G06F 21/10 (2013.01)
G06F 21/60 (2013.01)
(52) U.S. Cl.
CPC ............ *G06F 21/10* (2013.01); *G06F 21/602* (2013.01)
(58) Field of Classification Search
None
See application file for complete search history.

(56) References Cited

U.S. PATENT DOCUMENTS 7,236,817 B2 * 6/2007 Papas ..................... A61B 6/032
600/407
7,461,405 B2 * 12/2008 Boudreault ........ H04N 21/8355
726/28

(Continued)

FOREIGN PATENT DOCUMENTS

KR 102108402 B1 5/2020
WO WO 2020/079527 * 4/2020 ............. G06F 21/62

OTHER PUBLICATIONS

International Search Report and Written Opinion for International Application No. PCT/AU2022/051413, dated Feb. 6, 2023.

*Primary Examiner* — Backhean Tiv
(74) *Attorney, Agent, or Firm* — Westman, Champlin & Koehler, P.A.

(57) ABSTRACT

The disclosure relates to a method and system for storing, sharing, rendering, and simulation of 3-dimensional digital data models so that the model cannot be copied or distributed or physically replicated and thus maintain the security of the model. Protecting a file containing digital data of a 3-dimensional representation of an object suitable for reproduction by a 3-dimensional model-making device. A method comprises converting a digital data file representative of a 3-dimensional object by removing predetermined parts of the digital data file to create a converted digital data file and encrypting the converted digital data file using an encryption algorithm and encoding key to create an encrypted digital data file having a file format; and making available the converted and encrypted digital data file in the file format to a software environment, wherein the software environment is suitable for decrypting and reconstructing the digital data into digital data.

14 Claims, 8 Drawing Sheets

(56) References Cited

U.S. PATENT DOCUMENTS

| | | | |
|---|---|---|---|
| 7,660,902 B2 * | 2/2010 | Graham | H04L 69/329 |
| | | | 709/219 |
| 8,918,651 B2 * | 12/2014 | Greco | G06F 21/80 |
| | | | 713/193 |
| 9,521,123 B2 * | 12/2016 | Jueneman | H04L 9/085 |
| 10,445,518 B2 * | 10/2019 | Erofeev | H04L 9/0825 |
| 11,979,388 B2 * | 5/2024 | Pollet | H04L 63/0435 |
| 12,197,553 B2 * | 1/2025 | Bonutti | H04L 63/0861 |
| 2004/0003264 A1 * | 1/2004 | Zeman | G06F 21/14 |
| | | | 713/190 |
| 2007/0083467 A1 * | 4/2007 | Lindahl | G11B 20/00195 |
| | | | 375/E7.009 |
| 2008/0111816 A1 * | 5/2008 | Abraham | G06Q 30/06 |
| | | | 345/420 |
| 2013/0004090 A1 * | 1/2013 | Kundu | G06Q 20/20 |
| | | | 382/284 |
| 2014/0337985 A1 * | 11/2014 | Muyshondt | G06F 21/125 |
| | | | 726/26 |
| 2015/0242737 A1 * | 8/2015 | Glazberg | B29C 64/00 |
| | | | 235/494 |
| 2016/0063187 A1 * | 3/2016 | Vettrival | G16Z 99/00 |
| | | | 705/51 |
| 2016/0180061 A1 * | 6/2016 | Pogorelik | G05B 19/4099 |
| | | | 713/189 |
| 2018/0081997 A1 * | 3/2018 | Gupta | B29C 64/386 |
| 2019/0147626 A1 * | 5/2019 | Gebbie | G06T 9/00 |
| | | | 382/232 |
| 2020/0287880 A1 * | 9/2020 | Getsin | H04L 9/0894 |
| 2021/0390205 A1 * | 12/2021 | Chua | G06F 21/602 |
| 2025/0028844 A1 * | 1/2025 | Sandow | G06F 21/10 |

* cited by examiner

Prosthesis Vendor Setup

STL files stored internally
- Firewalled/protected with no public accessibility

Host website
- Directory of available STL files
  - Thumbnails
  - Description
  - Variations/sizes Surgeons wanting to use the service:
- Registered with details (email address, mobile)
- Issued username & password

Fig. 5

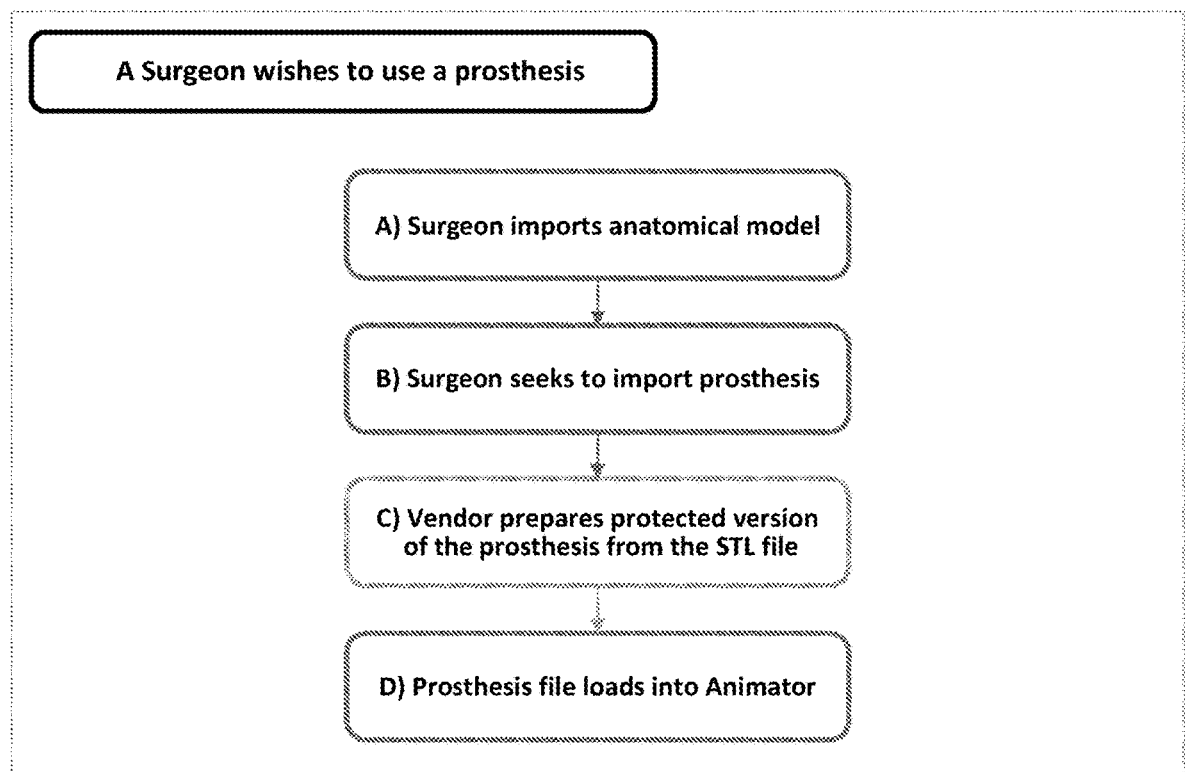

A Surgeon wishes to use a prosthesis

A) Surgeon imports anatomical model

B) Surgeon seeks to import prosthesis

C) Vendor prepares protected version of the prosthesis from the STL file

D) Prosthesis file loads into Animator

Fig. 6

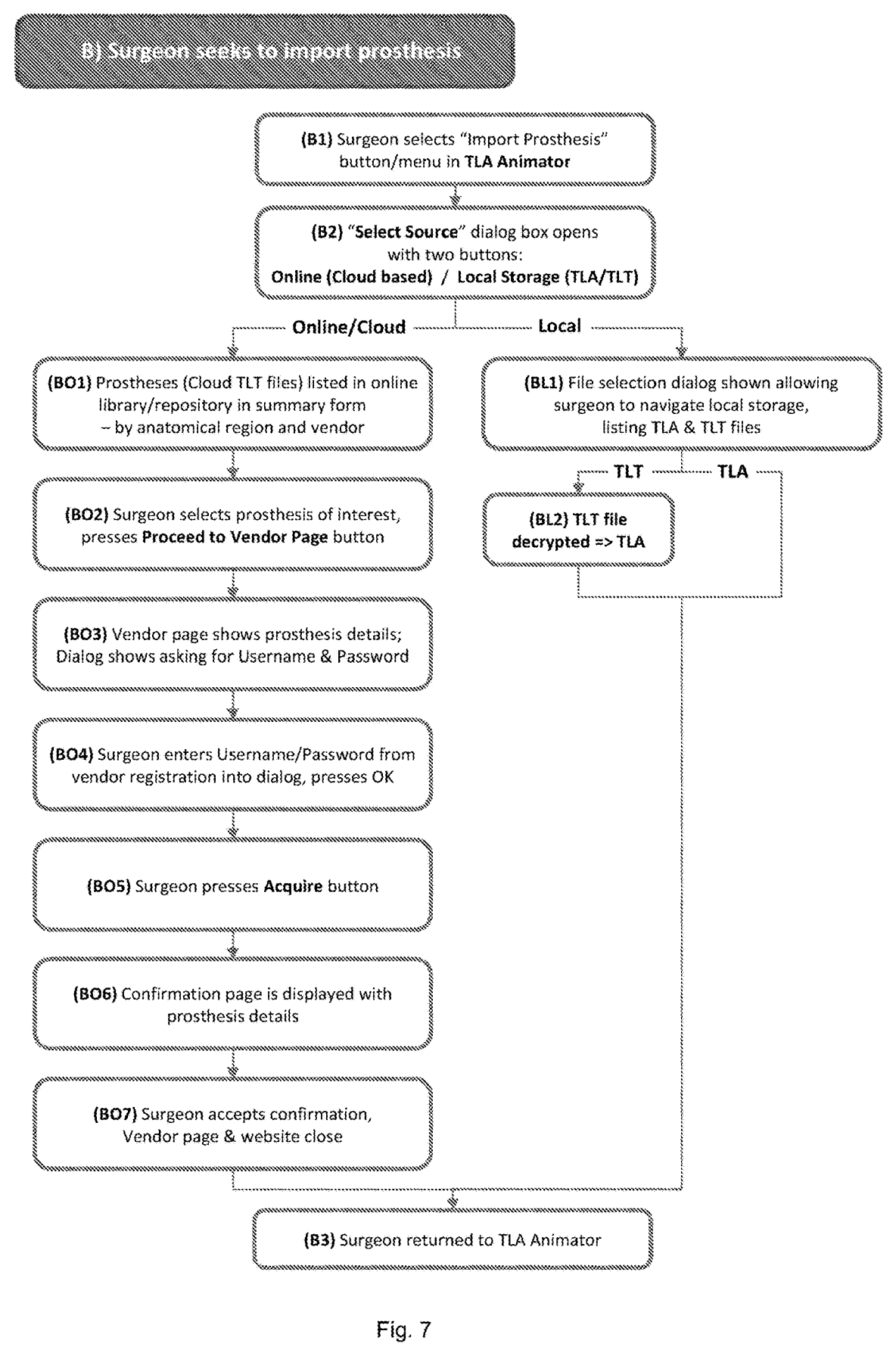

B) Surgeon seeks to import prosthesis

(B1) Surgeon selects "Import Prosthesis" button/menu in TLA Animator

(B2) "Select Source" dialog box opens with two buttons:
Online (Cloud based) / Local Storage (TLA/TLT)

— Online/Cloud — | — Local —

(BO1) Prostheses (Cloud TLT files) listed in online library/repository in summary form – by anatomical region and vendor

(BL1) File selection dialog shown allowing surgeon to navigate local storage, listing TLA & TLT files

— TLT — — TLA —

(BO2) Surgeon selects prosthesis of interest, presses Proceed to Vendor Page button

(BL2) TLT file decrypted => TLA

(BO3) Vendor page shows prosthesis details; Dialog shows asking for Username & Password

(BO4) Surgeon enters Username/Password from vendor registration into dialog, presses OK

(BO5) Surgeon presses Acquire button

(BO6) Confirmation page is displayed with prosthesis details

(BO7) Surgeon accepts confirmation, Vendor page & website close

(B3) Surgeon returned to TLA Animator

Fig. 7

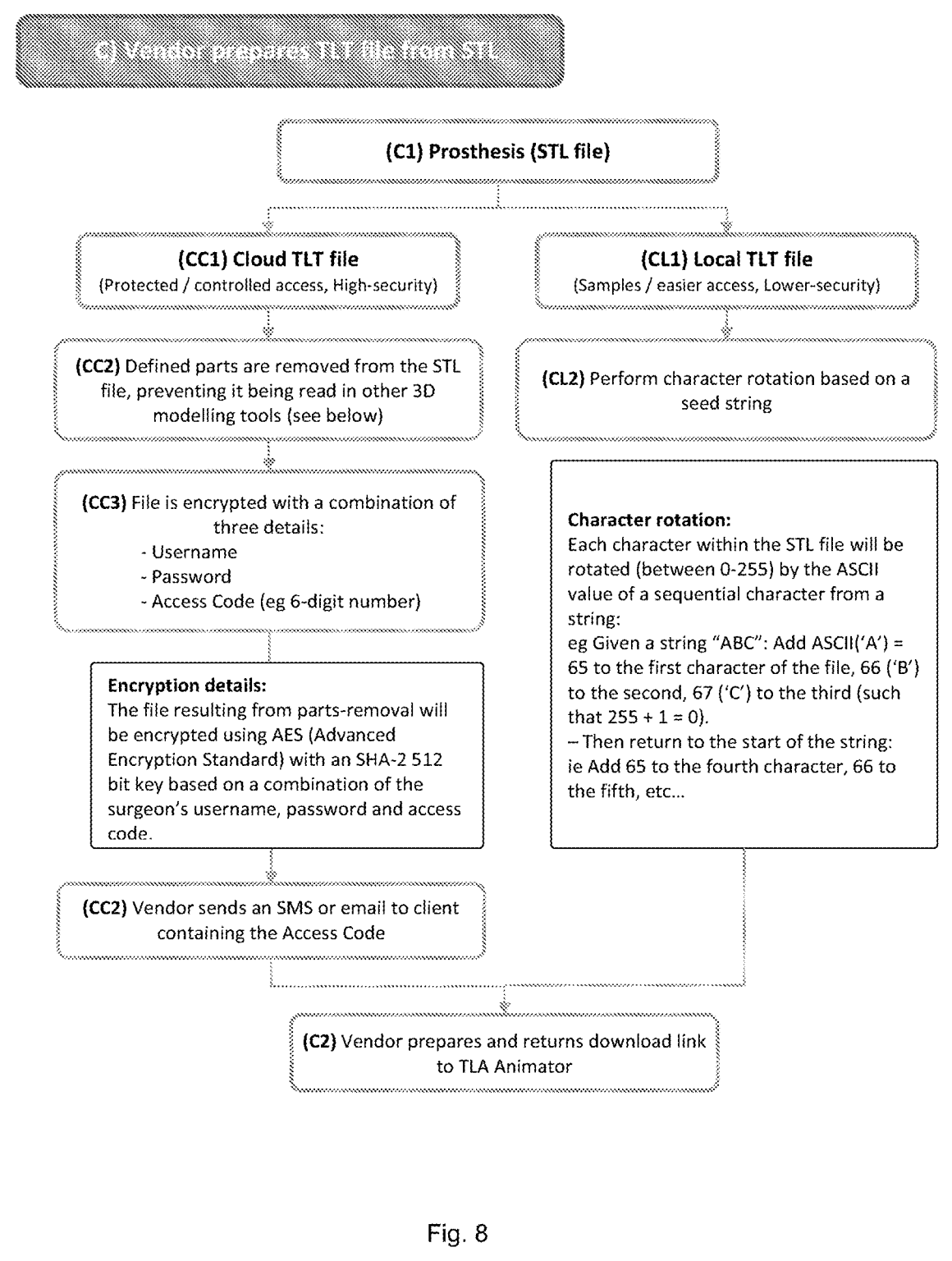

(3) Vendor prepares TLT file from STL

(C1) Prosthesis (STL file)

(CC1) Cloud TLT file
(Protected / controlled access, High-security)

(CL1) Local TLT file
(Samples / easier access, Lower-security)

(CC2) Defined parts are removed from the STL file, preventing it being read in other 3D modelling tools (see below)

(CL2) Perform character rotation based on a seed string

(CC3) File is encrypted with a combination of three details:
- Username
- Password
- Access Code (eg 6-digit number)

Character rotation:
Each character within the STL file will be rotated (between 0-255) by the ASCII value of a sequential character from a string:
eg Given a string "ABC": Add ASCII('A') = 65 to the first character of the file, 66 ('B') to the second, 67 ('C') to the third (such that 255 + 1 = 0).
– Then return to the start of the string: ie Add 65 to the fourth character, 66 to the fifth, etc...

Encryption details:
The file resulting from parts-removal will be encrypted using AES (Advanced Encryption Standard) with an SHA-2 512 bit key based on a combination of the surgeon's username, password and access code.

(CC2) Vendor sends an SMS or email to client containing the Access Code

(C2) Vendor prepares and returns download link to TLA Animator

Fig. 8

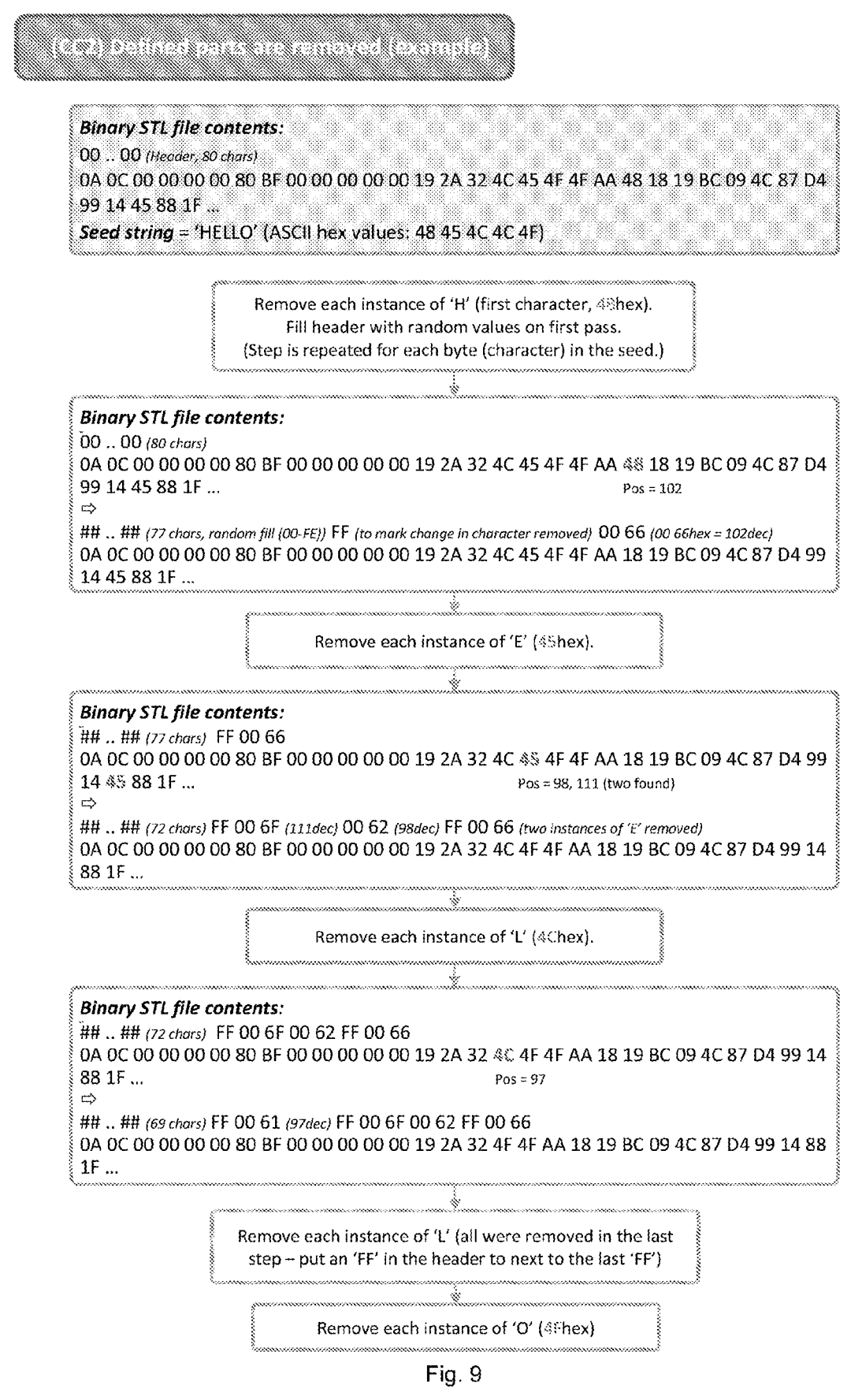

(C-3) Optimal Spaces are removed (example)

Binary STL file contents:
00 .. 00 *(Header, 80 chars)*
0A 0C 00 00 00 00 80 BF 00 00 00 00 00 19 2A 32 4C 45 4F 4F AA 48 18 19 BC 09 4C 87 D4
99 14 45 88 1F ...
Seed string = 'HELLO' (ASCII hex values: 48 45 4C 4C 4F)

Remove each instance of 'H' (first character, 48hex).
Fill header with random values on first pass.
(Step is repeated for each byte (character) in the seed.)

Binary STL file contents:
00 .. 00 *(80 chars)*
0A 0C 00 00 00 00 80 BF 00 00 00 00 00 19 2A 32 4C 45 4F 4F AA 48 18 19 BC 09 4C 87 D4
99 14 45 88 1F ...             Pos = 102
⇨
.. ## *(77 chars, random fill (00-FE))* FF *(to mark change in character removed)* 00 66 *(00 66hex = 102dec)*
0A 0C 00 00 00 00 80 BF 00 00 00 00 00 19 2A 32 4C 45 4F 4F AA 18 19 BC 09 4C 87 D4 99
14 45 88 1F ...

Remove each instance of 'E' (45hex).

Binary STL file contents:
.. ## *(77 chars)* FF 00 66
0A 0C 00 00 00 00 80 BF 00 00 00 00 00 19 2A 32 4C 45 4F 4F AA 18 19 BC 09 4C 87 D4 99
14 45 88 1F ...             Pos = 98, 111 (two found)
⇨
.. ## *(72 chars)* FF 00 6F *(111dec)* 00 62 *(98dec)* FF 00 66 *(two instances of 'E' removed)*
0A 0C 00 00 00 00 80 BF 00 00 00 00 00 19 2A 32 4C 4F 4F AA 18 19 BC 09 4C 87 D4 99 14
88 1F ...

Remove each instance of 'L' (4Chex).

Binary STL file contents:
.. ## *(72 chars)* FF 00 6F 00 62 FF 00 66
0A 0C 00 00 00 00 80 BF 00 00 00 00 00 19 2A 32 4C 4F 4F AA 18 19 BC 09 4C 87 D4 99 14
88 1F ...             Pos = 97
⇨
.. ## *(69 chars)* FF 00 61 *(97dec)* FF 00 6F 00 62 FF 00 66
0A 0C 00 00 00 00 80 BF 00 00 00 00 00 19 2A 32 4F 4F AA 18 19 BC 09 4C 87 D4 99 14 88
1F ...

Remove each instance of 'L' (all were removed in the last
step – put an 'FF' in the header to next to the last 'FF')

Remove each instance of 'O' (4Fhex)

Fig. 9

3-D PROSTHETIC OR OBJECT MODEL FILE SECURE ENCAPSULATION IN A NON-DISTRIBUTABLE IMAGE RENDERING FILE FORMAT

CROSS REFERENCE TO RELATED APPLICATION(S)

This application is a Section 371 National Stage Application of International Application No. PCT/AU2022/051413, filed on Nov. 25, 2022, entitled "3-D PROSTHETIC OR OBJECT MODEL FILE SECURE ENCAPSULATION IN A NON-DISTRIBUTABLE IMAGE RENDERING FILE FORMAT", which published as WIPO Publication No. 2023/092186 A1, on Jun. 1, 2023, in English, which claims priority to Australian Patent Application No. 2021903803, filed on Nov. 25, 2021, the contents of which are incorporated herein by reference in their entireties.

FIELD

Aspects of the disclosure relate to a method and system for storing, sharing, rendering, and simulation of 3-dimensional models. Models include medical prostheses so that the viewer of the 3-dimensional models can view and manipulate the model in a virtual environment but cannot copy or distribute the model or alter the 3-dimensional model so that it can be digitally or physically replicated distributed and thus maintain the security of the model.

BACKGROUND

By way of example only, the following description will reveal details of the use of 3-dimensional models in a medical environment. However, the security of a 3-dimensional model that needs to be viewed in a virtual environment is a situation that applies to models of consumer products, parts of complex machines or an element of a device such as a part of a tool. In the design of any part or portion of a device, there are tangible advantages in visualising the device and parts or portions of the device in a virtual environment which mimics the real-world environment. Testing, evaluation, assessment and the exercise of judgement by those skilled with those devices in the real world can then be done without actually having to place a genuine part into an actual device, person or natural environment. Of course, that will be done in time, but reviewing the designed 3-dimensional model in a virtual environment will maximise the likelihood that the modelled part will actually work once the 3-dimensional model is made in accordance with the dimensions defined by the 3-dimensional model.

Thus, by way of example only, when an orthopaedic surgeon needs to replace a bone or part thereof, reinforce a bone, augment a bone or any of various other surgical procedures, the final shape of the prosthesis which will be inserted, attached or otherwise integrated with existing bone or a part of a human body is critical to the efficacy of the medical and surgical procedure. In addition, of course, there are many other factors critical to the procedure's efficacy. A non-exhaustive list includes the material used to create the prosthesis, the current healing capability and likely healed state of the bone or body part, the condition and disturbance to existing or repaired ligaments and other surrounding tissue, the method of surgery, and many more.

Assistive medical technology provides many tools to visualise the damaged or diseased bone or body part and the surrounding environment in two and three dimensions. With appropriate software tools, it is possible to capture in digital format/s all the physical details and dimensions of the region of the body of particular interest to the surgeon. Complementary to the digital file/s that defines the physical environment of the relevant body portion is the technical ability to display that portion of the body in two and three dimensions. The above software tools greatly assist the surgeon in virtually assessing the damage or disease without invasive surgery. It is also possible with those tools to superimpose digital representations of proposed changes to the bone or bones in the virtual domain. The surgeon then uses clinical observations, their vast knowledge and expertise, and the visualisations to request one or more prosthesis designs that they believe will perform the required tasks. The surgeon can use their experience with the range of prostheses available from a particular manufacturer that performs the prosthetics process to create artificial body parts to identify one or more of the range of prostheses to be supplied in preparation for surgery. This is a costly exercise as the surgeon and manufacturer must use their time and resources to meet the demands required. Alternatively, the surgeon can specify that specific alterations be made to a standard prosthesis.

Companies that manufacture prostheses also design them, and the company employees exercise great skill and care to create a shape that best suits a surgeon's needs. The prosthesis is typically wholly designed in the digital environment using a combination of previous shapes and configurations; in some cases, the designer uses detailed instructions and suggestions from surgeons. A great deal of skill is employed in creating prostheses and the digital files defining their result from that design effort. As a result, the digital file representing a single prosthesis is unique. The digital file is, however, purposely created in a format that allows for a suitable computer-controlled machine to create the specified prosthesis to have the exact shape and configuration created by the designer and defined by that detailed digital file. Such files are commonly created using a particular format called an STL (Standard Tessellation Language or STereoLithography) file. In addition, the file is self-contained in that it is in a format that any suitable computer, including a computer processor and installed program/s, can read to display the prosthesis, and any suitable computer-controlled article manufacturing machine can create a physical embodiment of the digital design to the exact dimensions defined therein.

The type of machine that is capable of physically creating the solid object from the digital file is typically costly, mainly due to the accuracy of the finished model/prosthesis and the ability to create the object using a specified material. In the case of a medical prosthesis, common materials include cobalt-chromium alloy, titanium alloy, and carbon fibre-reinforced polymer (CFRP) laminate. As would be expected for any object but particularly for medically implanted objects, out-of-plane bending moments, torsional moments, shear stresses, applied axial force, torsion, elastic modulus and stiffness characteristics of the shape, configuration and material of the object/prosthesis is all part of the design and final material choice.

If a surgeon had an STL file of a particular prosthesis, they could arrange for it to be made by any suitable computer-controlled article manufacturing machine. Such machinery is not readily available to surgeons but is to competing prostheses manufacturers. As careful and contractually bound as a surgeon may be, it is still unlikely that the file or files representing multiple suitable prostheses will be made available to surgeons. Thus, since an STL file type is readable and the 3-dimensional model defined therein is readily reproducible, it is not common practice for the file defining any prosthesis to be made available externally and out of the control of the creator/owner of that prosthesis design. The same applies to any object (non-medical use objects are included explicitly in this consideration) defined by a digital file since that file is usable by a suitable machine to create that object once the digital file defining an object is available without control or enforceable constraints, that digital file is effectively in the public domain.

It is also not obligatory or necessary that the creator of the 3-dimensional model uses an STL file to define the digital file representation of the object. STL files are, but one format of a file format used to define a 3-dimensional object, and examples of others include (.obj; .dfx; .obx; .fbx; 3DS; STEP; VRMAL/X3D; COLLADA).

It makes sense for the surgeon to use the digital environment to visualise one or more prostheses designs represented by their respective STL format files. At the same time, it makes sense to superimpose a digital representation of one or more prostheses into the bone or body part that is the area of the body on which surgery is to be performed, the file depicting the area of the body typically being in the control of the surgeon as it forms part of the patient's health records.

However, since the STL file is so valuable to its creator/owner, it is standard practice for the surgeon to perform those viewings using computers owned, operated and controlled by the owner of the STL file, which has been permitted to use the patient's file or files such as x-ray, CT (computerised tomography)/CAT (computerised axial tomography), MRI (magnetic resonance imaging), and others. Alternatively, the surgeon is required to remotely view the images with an operator of the creator/owner managing the viewing process and performing the surgeon's requested transformation of those images. The scenario described is time-consuming, very inconvenient for the surgeon as well as expensive for the creator/owner of the file. The process is even more complicated if the surgeon wishes to manipulate the viewed images in real-time or in their own time, with fellow surgeons or even the patient. In some cases, very crude screen grabs of the prosthesis in the virtual representations of the bones and surrounding environment are supplied to the surgeon, so they can spend more time reviewing the images and discussing the procedure with their colleagues and the patient. Overall the need for the prosthesis designer to be in total control and possession of the STL file makes the tasks described much less than ideal, and therein is the problem to be solved.

How does the creator of an STL-like file provide a particular STL-like file for viewing and manipulation by a person who wishes to view the STL file without allowing the STL-like file to be copied, distributed and then reproduced into a solid object and thus avoid the STL-like file being misappropriated?

ASPECTS OF THE DISCLOSURE

The proposed solution involves performing several transformation and conversion steps in a predetermined software environment.

In an aspect, there is a method of protecting a file containing digital data of a 3-dimensional representation of an object suitable for reproduction by a 3-dimensional model-making device. The method comprises converting a digital data file representative of a 3-dimensional object by removing predetermined parts of the digital data file to create a converted digital data file; encrypting the converted digital data file using an encryption algorithm and encoding key to create an encrypted digital data file having a file format; and making available the converted and encrypted digital data file in the file format to a software environment, wherein the software environment is suitable for decrypting and reconstructing the digital data into digital data suitable for the display of a 3-dimensional representation of the object.

In an aspect, the method includes adding predetermined data to the digital data file to create a converted file.

In an aspect, the file is a Standard Tessellation Language formatted digital data file.

In an aspect, the Standard Tessellation Language formatted digital data file includes data representative of one or more of the following: resolution, angle control, chordal deviation, binary or ASCII format, vertex-to-vertex rules, orientation rules, and an all-positive rule of the data representative of the object.

In an aspect, a system for displaying a 3-dimensional representation of an object includes a computer processor specifically adapted to perform the method of claim 1 for making available the converted and encrypted digital data file in the file format to a software environment, wherein the software environment is suitable for decrypting and reconstructing the digital data into digital data suitable for the display of a 3-dimensional representation of the object; an image-generating arrangement to receive the converted and encrypted digital data file and decrypt and reconstruct the 3-dimensional representation of the object and display the object integrated with other objects within a software environment such that the object is visible to the user of the software and the user cannot replicate the 3-dimensional model in any format sufficient to create the equivalent of the 3-dimensional model in any physical or virtual form external to the immediate viewing environment.

The system, method and any apparatus disclosed in this specification are intended to provide at least an alternative to the 3-dimensional model distribution and sales systems currently available or alleviate or minimise the problems and shortcomings associated with existing systems, of which one problem is the ability of a 3-dimensional model file being distributable once in possession of an intended or potential purchaser of the object represented by that model.

In an aspect, the object is a Standard Tessellation Language (STL) formatted data file.

In an aspect, the data file includes predetermined resolution, angle control, chordal deviation, binary or ASCII, vertex-to-vertex rules, orientation rules, and an all-positive rule.

The reference to any prior art in this specification is not, and is not to be taken as, an acknowledgement of any form of suggestion that such prior art forms part of the common general knowledge.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

It will be appreciated by those skilled in the art that the disclosure described herein is not restricted in its use to the particular application described. Neither is the disclosure restricted in its preferred embodiment concerning the particular elements and features described or depicted herein. It will be appreciated that the scope of the disclosure is not limited to the embodiment or embodiments disclosed but is capable of numerous rearrangements, modifications, and substitutions without departing from the scope as set forth and defined by the claims.

Some embodiments described herein may be implemented using programmatic elements, often called modules or components, although other names may be used. Such programmatic elements may include a program, a subroutine, a portion of a program, a software component or a hardware component capable of performing one or more stated tasks or functions. As used herein, a module or component can exist on a hardware component independently of other modules/components, or a module/component can be a shared element or process of other modules/components, programs or machines. A module or component may reside on one machine, such as on a client or a computer server, or a module/component may be distributed amongst multiple machines, such as on multiple clients or computer server machines. Any system described may be implemented in whole or in part on a computer server or as part of a network service. Alternatively, a system described herein may be implemented on a local computer, computer processor, computer terminal, or server in whole or part. In either case, implementation of the system provided for in this application may require the use of memory, processors and network resources (including data ports, and signal lines (optical, electrical and other communication modalities), unless stated otherwise. Each program executed on a processor changes the state of the processor and makes it perform an action that is, in some cases, unique for the operation of the processor when performing the actions defined by the program. The changed state of the computer interacts with peripherals, and those actions may be unique to the peripheral.

Some embodiments described herein may generally require the use of computers, and computer processors, including processing and memory resources. For example, systems described herein may be implemented on a server or network service. Such computer servers may connect and be used by users over networks such as the Internet or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment of a method or system described herein (specifically including the performance of embodiments of a method or implementation of a system).

Furthermore, some embodiments described herein may be implemented using instructions that are executable by one or more processors. These instructions may be carried on a computer-readable medium. Machines that may be shown in the figures provide examples of processing resources and computer-readable mediums on which instructions for implementing embodiments can be carried out and executed. In particular, the numerous machines associated with one or more embodiments include a processor(s) and various forms of memory for holding data and instructions. Examples of computer-readable mediums include permanent memory storage devices, such as hard drives on personal computers or computer servers. Other examples of computer storage mediums include portable storage units, such as CD or DVD units, flash memory (such as carried on many cell phones and personal digital assistants (PDAs), and magnetic memory. Computers, terminals, and network-enabled devices (e.g. mobile devices such as cell phones) are all examples of machines and devices that use processors. In most cases, instructions are stored on transitory and non-transitory computer-readable mediums, including RAM, ROM and EPROM devices.

The present disclosure can be implemented in numerous ways, including as a process, an apparatus, a system, or a computer-readable medium such as a computer-readable storage medium or a computer network wherein program instructions and digital data files are sent over wireless, optical, or electronic communication links. It should be noted that the order of the steps of disclosed processes may be altered within the scope of the disclosure.

Details concerning computers, computer networking, software programming, telecommunications and the like may at times not be illustrated explicitly as such was not considered necessary to obtain a complete understanding nor to limit a person skilled in the art of performing the embodiments, are considered present nevertheless as such are considered to be within the skills of persons of ordinary skill in the art.

The prior summary is provided to introduce a simplified selection of concepts described below in the Detailed Description of Embodiments. The summary is not intended to identify any or all of the claimed subject matter's key features or essential features.

It will be appreciated by those skilled in the art that this disclosure is not restricted in its use to the particular application or applications described. Neither is the present disclosure restricted in its preferred embodiment with regard to the particular elements and features described or depicted herein. It will be appreciated that the disclosure is not limited to the embodiment or embodiments disclosed but is capable of numerous rearrangements, modifications and substitutions without departing from the scope as set forth.

BRIEF DESCRIPTION OF THE FIGURES

FIG. 5 depicts a prosthesis supplier setup process;

FIG. 6 depicts the broad steps of the process of FIG. 5 and also depicts the process performed by a practitioner wishing to import a selected prosthesis model;

FIG. 7 depicts more detail about the interaction of the practitioner (surgeon in FIG. 7) with the supplier's website but which is also similar to the steps described in regards to FIG. 3;

FIG. 8 depicts a variation of the steps depicted in FIG. 2 of the supplier preparation of a TLT from an STL file; and FIG. 9 depicts an example of how to remove parts of a binary STL file.

DETAILED DESCRIPTION OF EMBODIMENTS

Figure 1:
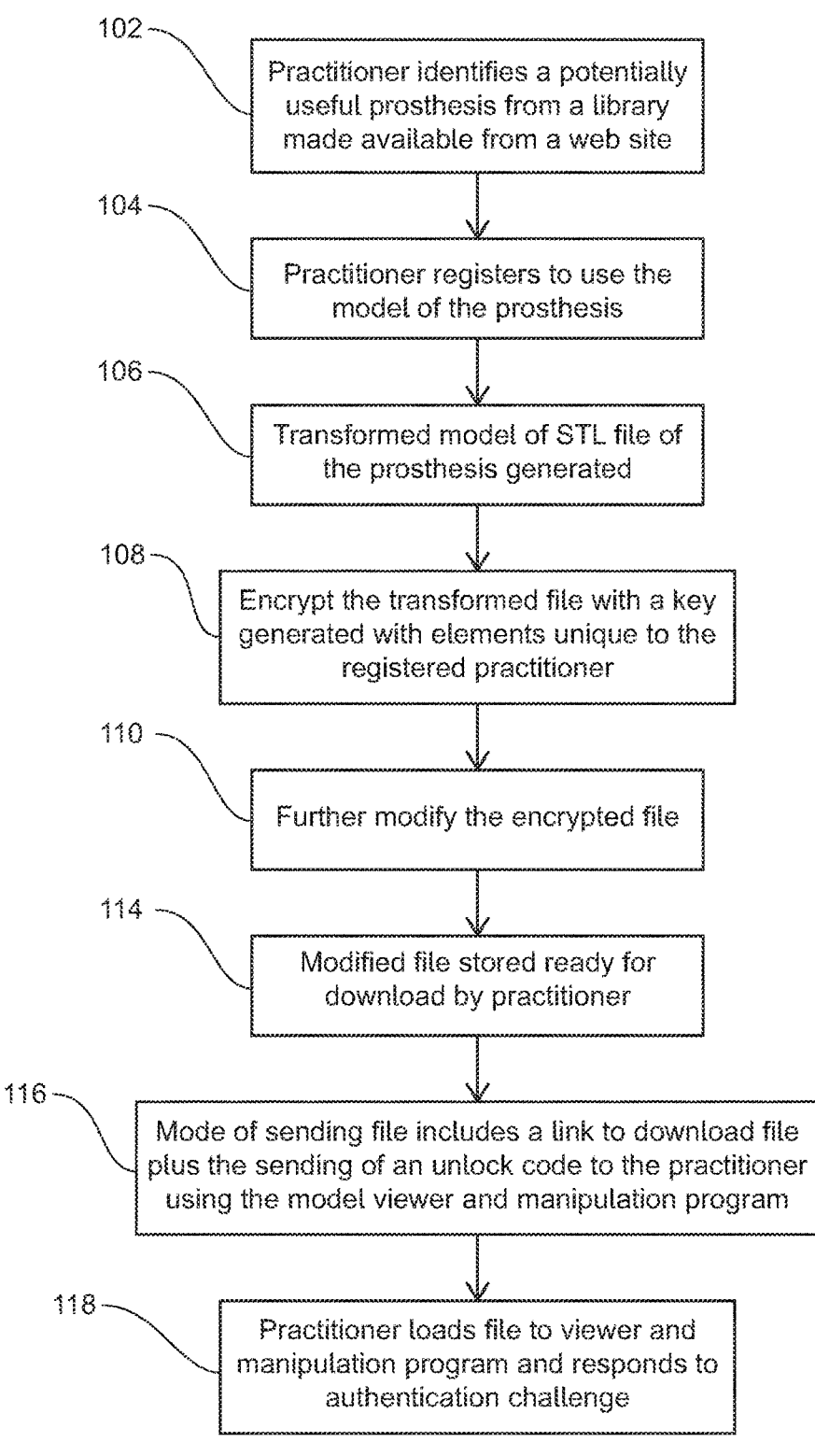
FIG. 1 is a single flow diagram of preferred and optional steps in the process of creating a TLT file using a provided STL file.

Reference is made in this description to a software environment which is a 3-dimensional visualisation tool that uses CAT/CT or MRI scans of a vertebrate animal or human body part to provide an on-screen visualisation of that body part and the ability to manipulate that 3-dimensional representation so that the viewer can see that body part from any perspective and at any granularity within the limits of the resolution of the original scan and the screen used by the user. Within a software environment, objects are made visible to the user.

By way of example only, such a viewer is the True Life Anatomy (TLA) suite of software tools (including the TLA generator and TLA animator tool software) which offers multi-dimensional displays, 2D to 3D processing and model generation, motion analysis and generation, 2D/3D measurement tools, virtual pre-operative procedure simulation (VPOPS), advanced biomedical imaging processing and analysis, and much more. The TLA software is available from RuBaMAS Pty Ltd, Adelaide, Australia. Incorporated by reference in total into this specification, where allowable, is published U.S. Pat. No. 7,236,817, which provides a detailed description of how the TLA software (Reader, Generator and Animator) tools work. This particular software tool is but one of many 2-dimensional and 3-dimensional body part visualisation tools. Hence, the disclosure herein also applies to those software tools once suitable and adapted to perform the methods disclosed herein.

The methods disclosed in this specification will benefit Computer-Aided Design (CAD) production companies that create 3D models or articles and want and need to display that model to their clients but currently have no secure way of sharing a 3-dimensional model. At the same time, avoid the model being misappropriated.

The TLA suite of software tools includes a reader adapted to allow the viewing of a transformed and non-distributable 2-dimensional or 3-dimensional object, such as the bones of a patient, and that software is also adapted to allow the viewing of a file of a model so that a company that has created a file of a 2-dimensional or 3-dimensional model (in an STL or Computer Aided Design (CAD) file format or any other suitable format) and which is considered valuable to the company that created that model, can send a transformed file to their client for viewing and possible manipulation within a selected environment but not be able to distribute the object model, where the environment is a 2-dimensional or 3-dimensional rendering of that environment and the rendering of the transformed model, such as a digital representation of the patient's body part. In particular, a patient's body part is the subject of a surgeon's need to implant the prosthesis into that body part. The client (such as a surgeon/practitioner) can then view the 2-dimensional or 3-dimensional file in an environment that allows them to view the object represented in the file at their convenience and in conjunction with the actual skeletal features of their patient. Furthermore, in specific software environments, the surgeon could manipulate a "what-if" model with one or more proposed prostheses models likely to do the job at hand. However, the surgeon cannot distribute the STL model (or other model formats) to others to reproduce the model.

All 3-dimensional representations of an object use a file format and, by way of example, an STL file which describes all the triangular surfaces and their outer surface orientation defined by a unit length normal and each of the three vertices of the triangle using a known 3-dimensional coordinate system (for example the Cartesian coordinate system). A facet normal for the triangle in an STL format (ASCII and Binary) is a unit vector pointing out from the solid object from the origin coordinate (0, 0, 0) using a predetermined coordinate system. There are a variety of coordinate systems, and the person of skill in this area of endeavour is capable of making the determination. Furthermore, the order of all the facets is deemed by the right-hand rule. Both positive and negative numbers representing the three vertices are allowable, and the unit length is arbitrary. Although it is rare to specify a normal that cannot be calculated using the right-hand rule, a file should provide the facet normal to be entirely portable and order the vertices appropriately. There will be at least one shared pair of vertices defining one side of each of the two adjacent triangles.

The number of triangles used to represent the object will affect the smoothness of the object created using the file to generate a physical representation of that object. Too large a number of triangles will not improve the smoothness if the manufacturing tolerances are greater than the smallest triangle. Conversely, too few triangles will create a relatively rough surface if that file is used to generate a physical representation of that object. There are two smoothness parameters: chord height and angular tolerance.

A measure of visual smoothness of the model is provided by the dimension referred to as chord height, which is the maximum distance the design software will allow between the surface of the desired 3-dimensional model and the surface of the relevant triangle of the 3-dimensional file representation. It is noted that the smaller the chord height, the smoother the curvature of the surface of the 3-dimensional file representation of the object. For example, a chord height of one-twentieth of the 3-dimensional printer layer thickness is typical.

Angular tolerance is the angle between each normal of adjacent triangles, where 15 degrees is a common default setting.

When STL files are used to define an object, and it is necessary to use a Computer Aided Manufacturing (CAM) system/device, it is preferable to assign the appropriate dimension to the unit: metric (typically a millimetre); or imperial (typically an inch). Further, the CAM system/device may need to reconstruct the connectivity of the triangles.

For illustrative and explanatory purposes and thereby not to limit in any way the mode of coding/defining a solid shape usable in the method and arrangement disclosed herein, an example of the structure of an ASCII STL file follows:

```
solid shape
  facet normal n_i n_j n_k
    outer loop
      vertex v1_x v1_y v1_z
      vertex v2_x v2_y v2_z
      vertex v3_x v3_y v3_z
    endloop
  endfacet
endsolid shape
```

Wherein each n or v is a floating point number in sign-"e"-exponent format eg. "2.7776340e−002".

Since ASCII STL files can be very large due to the use of ASCII characters (where each character is represented using Hex Code), an example of the structure of a Binary STL file follows:

```
UINT8[80] - Header - 80 bytes
UINT32 - Number of triangles - 4 bytes
For each triangle - 50 bytes:
REAL32[3] - Normal vector - 12 bytes
REAL32[3] - Vertex 1 - 12 bytes
REAL32[3] - Vertex 2 - 12 bytes
REAL32[3] - Vertex 3 - 12 bytes
UINT16 - Attribute byte count - 2 bytes
end
```

In a Binary STL file, each triangle is twelve 32-bit floating-point numbers: three for the normal: three for each of the X/Y/Z coordinates of each vertex, making up twelve numbers. The attribute byte count is typically zero.

Example ASCII STL file representing a simple cube.

```
solid STL generated by MeshLab
    facet normal −1.000000e+000 0.000000e+000 0.000000e+000
        outer loop
            vertex 0.000000e+000 3.000000e+001 0.000000e+000
            vertex 0.000000e+000 0.000000e+000 3.000000e+001
            vertex 0.000000e+000 3.000000e+001 3.000000e+001
        endloop
    endfacet
    facet normal −1.000000e+000 0.000000e+000 0.000000e+000
        outer loop
            vertex 0.000000e+000 0.000000e+000 0.000000e+000
            vertex 0.000000e+000 0.000000e+000 3.000000e+001
            vertex 0.000000e+000 3.000000e+001 0.000000e+000
        endloop
    endfacet
    facet normal 1.000000e+000 −0.000000e+000 0.000000e+000
        outer loop
            vertex 3.000000e+001 0.000000e+000 3.000000e+001
            vertex 3.000000e+001 3.000000e+001 0.000000e+000
            vertex 3.000000e+001 3.000000e+001 3.000000e+001
        endloop
    endfacet
    facet normal 1.000000e+000 0.000000e+000 0.000000e+000
        outer loop
            vertex 3.000000e+001 0.000000e+000 3.000000e+001
            vertex 3.000000e+001 0.000000e+000 0.000000e+000
            vertex 3.000000e+001 3.000000e+001 0.000000e+000
        endloop
    endfacet
    facet normal 0.000000e+000 −1.000000e+000 0.000000e+000
        outer loop
            vertex 3.000000e+001 0.000000e+000 0.000000e+000
            vertex 3.000000e+001 0.000000e+000 3.000000e+001
            vertex 0.000000e+000 0.000000e+000 0.000000e+000
        endloop
    endfacet
    facet normal 0.000000e+000 −1.000000e+000 0.000000e+000
        outer loop
            vertex 0.000000e+000 0.000000e+000 0.000000e+000
            vertex 3.000000e+001 0.000000e+000 3.000000e+001
            vertex 0.000000e+000 0.000000e+000 3.000000e+001
        endloop
    endfacet
    facet normal 0.000000e+000 1.000000e+000 0.000000e+000
        outer loop
            vertex 3.000000e+001 3.000000e+001 3.000000e+001
            vertex 3.000000e+001 3.000000e+001 0.000000e+000
            vertex 0.000000e+000 3.000000e+001 0.000000e+000
        endloop
    endfacet
    facet normal 0.000000e+000 1.000000e+000 0.000000e+000
        outer loop
            vertex 3.000000e+001 3.000000e+001 3.000000e+001
            vertex 0.000000e+000 3.000000e+001 0.000000e+000
            vertex 0.000000e+000 3.000000e+001 3.000000e+001
        endloop
    endfacet
    facet normal 0.000000e+000 0.000000e+000 −1.000000e+000
        outer loop
            vertex 0.000000e+000 3.000000e+001 0.000000e+000
            vertex 3.000000e+001 3.000000e+001 0.000000e+000
```

-continued

```
            vertex 0.000000e+000 0.000000e+000 0.000000e+000
        endloop
    endfacet
    facet normal 0.000000e+000 0.000000e+000 −1.000000e+000
        outer loop
            vertex 0.000000e+000 0.000000e+000 0.000000e+000
            vertex 3.000000e+001 3.000000e+001 0.000000e+000
            vertex 3.000000e+001 0.000000e+000 0.000000e+000
        endloop
    endfacet
    facet normal 0.000000e+000 0.000000e+000 1.000000e+000
        outer loop
            vertex 3.000000e+001 3.000000e+001 3.000000e+001
            vertex 0.000000e+000 3.000000e+001 3.000000e+001
            vertex 0.000000e+000 0.000000e+000 3.000000e+001
        endloop
    endfacet
    facet normal 0.000000e+000 0.000000e+000 1.000000e+000
        outer loop
            vertex 3.000000e+001 3.000000e+001 3.000000e+001
            vertex 0.000000e+000 0.000000e+000 3.000000e+001
            vertex 3.000000e+001 0.000000e+000 3.000000e+001
        endloop
    endfacet
endsolid vcg
```

The dimensions of the cube are contained within the file. However, the STL file format does not have the capacity for the specification of units. The size of this cube is 30×30×30, and it contains 12 facets.

Other versions of the STL file format allow for the use of colour during the 3-dimensional creation process. Of course, a Binary file is an ordered series of '1's and '0' digital values.

In the embodiment to be described, the object defined by an STL (or similar file) is a prosthesis to be surgically implanted into or onto a body part. However, the object defined by the selected file format could represent any 3-dimensional object such as a machine part, a 2 or 3-dimensional work of art, a component of a device, etc. The design of the object typically takes great skill and time, and the actual digital file representing the object is not made available to the end user of the object. It is in the interests of the designers and hence the supplier of the object to keep the actual file safe and only provide that original file to the equipment that can manufacture the 3-dimensional object, typically totally under the control of the same company. Otherwise, the nature of such files is that they can be used by any supplier to accurately reproduce the object without the effort to design that object.

Thus, the original STL file is never provided to the practitioner or any other future user of the final object. However, the shape, size and configuration of the prosthesis, at least for the practitioner, are the important features that need to be assessed as best they can be, without actually performing the surgery, to find out whether the shape, size and configuration, of the object is suitable for the task at hand. The prosthesis supplier setup process is described in FIG. 5 and includes the need for the STL model files to be created and stored internally and protected by whatever means is available to do so on computer server/s and associated digital storage memory (transitory and non-transitory). The setup may include but is not limited to one or more computers, computer servers, associated digital data storage, security-cleared personnel, firewall-protected digital data storage all elements being trained, adapted and configured by those of the relevant skill to exclude physical and digital access from external of the supplier's computer network/environment. To allow practitioners to view a directory of the prostheses available, a website can be set up which can provide thumbnail images, descriptions of material, dimension/s, etc., allowing a practitioner to make an initial selection of which prostheses they assess may be suitable for the task at hand. The website can be removed and be independent of the suppliers' computer network/environment and is adapted to receive practitioner registration details and issue password and login details as required.

It is typical for an image of the patient's body part to be created using MRI or similar imaging technology so the practitioner can assess the body part's condition. If the condition can be improved by implanting a single prosthesis, the practitioner will determine the prosthesis's most suitable type, shape, and size. The practitioner will know of one or more prostheses suppliers, and likely, one of the ranges of prostheses of each supplier will be suitable. The practitioner's knowledge of the prostheses and available images will typically suffice for the practitioner to order one and generally two or three prostheses of slightly different sizes for supply to them before surgery.

Ideally, the practitioner would prefer to virtually manipulate a 3-dimensional model of the likely suitable prosthesis in conjunction with a 3-dimensional image of the body part. The outcome of that process will look something like that displayed in FIG. 4.

Referring to FIG. 1, the practitioner identifies 102 a potentially useful prosthesis from a library made available from a website or the software of a 3-dimensional virtual visualisation program, such as by way of example, the TLA suite of software tools which includes a reader adapted to allow the viewing of a transformed 2-dimensional or 3-dimensional file of a model or at this stage of the process a simple image of a range of prostheses is made available. Low-resolution images of an original prosthesis model have been displayed to the practitioner with brief descriptions of their characteristics and the various available sizes. There may be multiple images of prostheses from various perspectives so the practitioner can make the best choice in the circumstances. As described previously, the practitioner may select one or more prostheses. However, this disclosure of the model acquisition process and the embodiment discloses the obfuscation of the prosthesis model usable by the practitioner and other aspects. Also, in this disclosure, a single prosthesis of interest to the practitioner will illustrate the process so that they, as the potential purchaser can make an assessment of the suitability of the prosthesis.

In another embodiment, low-resolution images (for example, thumbnail images) of prostheses can be made available to practitioners for downloading and viewing on their computer devices. This can assist a practitioner in viewing offline a selected range of prostheses. Then they can go online to formalise the viewing and selection of a more detailed model of a single prosthesis.

Once the practitioner has made a choice and intends to use a particular prosthesis from a particular supplier, the practitioner will need to register 104 their intention and supply some or all the following details: email address, mobile phone number, create a user name and create a password that will be used later in the process. Since the supplier is known to the practitioner and the supplier will know of the practitioner, there is typically a sales/technical representative of the supplier that will be in an ongoing dialogue with the practitioner. There will also be a combination of exchanges between the website and the representative, and the practitioner to complete the registration process. However, the registration becomes unique when the registration details are associated with the prosthesis selected by that practitioner later in the process. Again, the intention is to ensure that a particular copy of the prosthesis model is uniquely associated with the practitioner.

The website displaying prostheses may be provided by or through the software program of an authorised third party. The supplier's website will control access to the extremely high-value STL (or another 3D file format) models they can manufacture and supply. Direct access to the original STL files representative of the most complex and high-value prostheses is not permitted. In computer terms, those files are access controlled. However, some original STL files (unmodified) may be provided to the third party for embedding into their software programs as obfuscated representations of those STL model files. Therefore, the model files can't be distributed to others so those others can reproduce the article defined by the model. In short, the practitioner's computer device and use of the third-party software ensure controlled access to the STL model files while the practitioner is using the third-party software. As will be disclosed, even low-value STL model files can be protected, so there is still an intention to keep the files proprietary and under the control of the supplier of those STL (or another 3D file format) model files.

However, not every prosthesis is necessarily made available for viewing since a practitioner may require specific modifications that only the prosthesis provider can create, and some prostheses are yet to be designed according to unique placement requirements defined by the practitioner.

When a practitioner opens the previously described TLA suite of software tools which includes an animator tool adapted to allow interactive viewing of a transformed 2-dimensional or 3-dimensional file of a selected STL model and which is adapted to display an anatomical model of the body part of the patient requiring the attention of the practitioner.

As mentioned previously, the anatomical model is created from a scan of the body part and displayed in a 3-dimensional virtual view which can be rotated and displayed from any point of view about the body part. For an orthopaedic practitioner, the bone or bones of interest are displayed and available for super-positioning of a prosthesis model over or within the virtual anatomical model (see FIG. 4 for an example display of the virtual environment). The anatomical model is also presented as an STL (or another 3D file format) data file created by another program from volumetric (usually CT or MRI) scan data.

Once the anatomical model is available on-screen, the prosthesis model deemed at that time to be most suitable needs to be imported into the TLA software animator tool and the practitioner activates that import request using a dedicated user interface interaction, such as by way of example, a virtual button press using a pointer. FIG. 6 illustrates that broad step of that process, and steps 102 and 104 of FIG. 1 and the associated description provide the details of those steps.

In an embodiment, the TLA software sends, along with selected practitioner registration details, an encoded command to the supplier's computer server, which can fulfil that request. The supplier's computer server makes a request page available to the practitioner, including the ability to select the prosthesis model deemed at that time to be most suitable and confirms that selection by interacting with the user interface, by way of example, activating a virtual 'acquire' button press using a pointer. In an embodiment, to ensure the appropriate prosthesis is going to be provided, a page of information, preferably including an image, is presented to the practitioner. Then the practitioner can confirm that selection by interacting with the user interface, by way of example, activating a virtual 'confirm' button press using a pointer. The supplier's web page closes at that stage, and the practitioner is returned to the TLA animator tool software screen.

The valuable file of a 2-dimensional or 3-dimensional prosthesis model (in an STL or Computer Aided Design (CAD) file format or any other suitable format) can then be transformed 106 before being provided to the TLA program being used by the practitioner so that the STL model file is non-distributable while being used by that practitioner in the TLA program.

Having established that the practitioner has registered and specified the prosthesis, the associated STL (or another 3D file format) file of the chosen prosthesis is accessed by the supplier/vendor. In an embodiment, one or more of the following transformation/s of the file takes place within the supplier computer server environment. The ASCII or binary version of any 3D file format is amenable to the disclosed transformations.

Step AAA, an optional step, involves removing specific recurring elements from the file and is applicable to binary-formatted STL files. That is, by example only, the removal of a specific string of '1's and '0's and there may be multiple other certain strings of '1's and '0's and their position stored and communicated to the software that is used to recreate the file along with a different code which identifies which strings were removed. Then, to recreate the file by replacing those strings, and in one example, the position of the removals will be stored in the header of the file.

By way of further example for an ASCII STL formatted file, the elements removed will be determined by the sequential use of characters in a string of characters. For example, String='hellothere'. Starting with 'h', thus remove each h (ASCII binary value 68H) from the file if the file is an ASCII STL formatted file, and then store the position of that character in the ASCII STL file in the header of the file starting at the end of this section, i.e. character 80, 79, etc. Then remove each 'e' (ASCII binary value 65H) from the file, storing the position of that character in the header, e.g. 78, 77, etc. Continue this removal until each character in the string has been considered or the header is full (80 characters). The order of filling the header is such that the position of the first removal occupies positions 80 and 79 of an 80-character header. If there is more than one 'h' in the ASCII STL file, then the position of the second occurrence of the second 'h' is filed in positions 78 and 77. Still, in our example, there is only one 'h', so the following letter 'e' location in the ASCLL STL file is determined and stored in the header at locations 78 and 77.

Since ASCII STL files are a lesser-used form of STL file format and Binary STL formats are more common, a similar method can be used, only this time, the binary bits equal to 2 hexadecimal digits are removed. Their position is stored in the header of the file. Thus, by way of further example, if there is exactly one instance of the characters in the string "hellothere" in the file, there would be exactly 10 characters (bytes) removed from the file, and the header would not be filled. Null or random values may be added to fill the header, or other techniques for filling or reusing the string are used to fill the header when dealing with ASCII STL file formats.

In binary STL format files, when removing 'h', the byte removed won't represent an 'h'. Instead, it will be the number 68H as part of a larger number, e.g. 360 decimal=0168H-so the binary representation of the decimal coordinate 360, 616, 872 in the file will appear in a binary as . . . 01 68 . . . 02 68 . . . 03 68. When we remove 'h', this will become . . . 01 . . . 02 . . . 03, and the file will be 3 bytes smaller.) Then storing the position of that character in the  binary  STL file in the header of the file starting at the end of a section, i.e. character 80, 79, etc. Then remove each 'e' (ASCII binary value 65H) from the file, storing the position of that character in the header, e.g. 78, 77, etc. Continue this removal until each character in the string has been considered or the header is full (80 characters). The order of filling the header is such that the position of the first removal occupies positions 80 and 79 of an 80-character header. If there is more than one 'h' in the binary STL file, then the position of the second occurrence of the second h' is filed in positions 78 and 77. Still, in the provided example, there is only one 'h', so the location of the following letter 'e' in the binary STL file is determined, and that location is stored in the header at locations 78 and 77.

FIG. 9 is an example of removing parts of a binary STL file wherein the header has 80 characters and the seed string="HELLO" (ASCII hex valued: 48 45 4C 4C 4F). As illustrated, the first pass removes each instance of the 'H' (first character, 48hex) from the binary file and notes the position from which that binary value was removed) and then fills the decimal position (pos=102) value in hex (00 66hex), so the 80 and 79 value in the header is 00 and 66, respectively, being the last and second to last position of the header filled with the following position 78 filled with the value FFhex to denote the boundary between each character of the seed string and then the rest of the header for the first pass filled with random values between 00-FE.

Referring to FIG. 9, the next pass is to remove the hex equivalent (45hex) of the letter "E", being the second letter on the seed string and note the position/s of the removal, there being two positions (dec=98, 111) and then fill the next header position 77 with the equivalent hex value first for dec98 (00 62hex) and the next header position 76 with dec111(00 6Fhex) and then the boundary marker value FF in header position 75, and then randomly fill or maintain or last-in-first-out of the remainder of the header. The process then replaces instances of the letter "L" from the seed string and so forth. Again, the algorithm is one of the selected algorithms, and other rules can apply as required to deal with two seed string letters being the same, etc.

Figure 2:
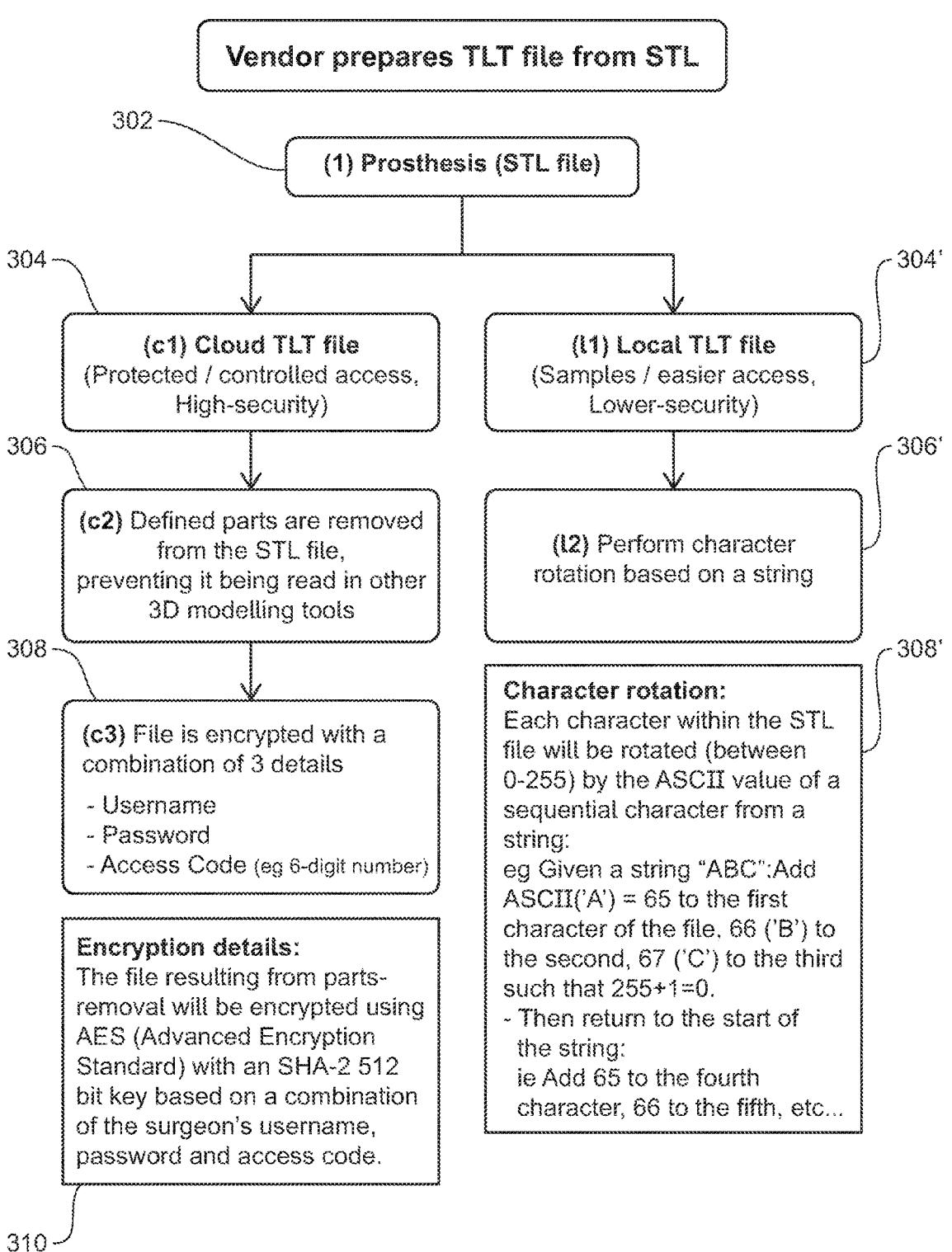
FIG. 2 is a flow diagram of the preferred and optional steps in the process of creating the transformed TLT file from a selected STL file (STL files of different values are disclosed) into a non-distributable format.

The removal of defined parts is one step, as illustrated in FIG. 2, step 306, and step CC2 in FIG. 8.

Thus, the transmitted and stored implant model is a modified version, and the specific elements removed will substantially affect the accuracy and shape of the 3-dimensional model unless the specific modification is recognised and the ASCII characters or BINARY equivalents are replaced by and within the TLA software environment.

Thus, practitioners using the TLA animator tool software are able to observe and manipulate the implant model within the TLA animator tool software since they work with an unreproducible STL model within the TLA software. At the appropriate time, the TLA animator tool software recognises that they have received (or drawn from local memory) a low-value STL file (which is still modified while locally stored) and determines that the STL file has been modified. Next, the TLA animator tool software reads the header file. Then, it determines the string to recreate the complete STL file after applying the required substitutions of values back into the required location. The relevant string is used according to a predetermined algorithm executed by the TLA animator software. Then having the complete implant model, the TLA animator tool software can simultaneously display the prosthesis and the model representative of the patient's body part, created by the TLA animator tool software from the patient's scans.

The practical result of step AAA is a conversion of the file, wherein the predetermined removed components make it impossible to display or manufacture the model with other than a predetermined software program that has the knowledge and a suitable record of which data elements and where data elements have been removed. A predetermination of the components to be removed can be applied once, or multiple different predeterminations can be used. When the data in a predetermined data file format is inspected, the elements removed are not readily or easily evident. Further, one or more elements are removed or not removed with each removal step, making it difficult for an external application to replace the removed components since the location of the replaced elements cannot be reverse-engineered. Making the converted, encrypted and formatted file available to a software environment suitable for displaying the predetermined file format as a 3-dimensional representation of the object in an animator software program environment requires that the software environment has access to which elements are removed. Thus, which elements are to be replaced and which may only be replaced in a general form by additive code processing of the file intended to be displayed within that predetermined computer environment. By way of example, the TLA animator software program environment. In any event, the converted, encrypted and formatted data forming the model used within the animator software program environment is not intended to be used for prosthesis reproduction but only for display purposes within that environment. The making available of the converted, encrypted and formatted file available to a software environment can be by way of allowing the file to be downloaded or sending the file as an attachment to an email addressed to the practitioner and by another method for transferring digital data files.

Encryption 108 of the file and any additional elements (such as a seed, components of a seed, an algorithm, etc.) to be communicated ensure a further level of security and obfuscation. There are many encryption algorithms; one example is Public Key and Private Key, and another is Secret Key, each with its well-known advantages and disadvantages. Encryption is not the only mode of securement or obfuscation of the file. While strong a encryption algorithm can provide security, encryption relies on appropriate key management practices since once the decryption key is known, that mode of security can no longer be relied on to secure the model if encryption is the only security method used.

Step BBB is the optional step 110 of using practitioner-specific data to create an encryption key to use with a selected encryption algorithm; an encryption key is created using as seed for the final key, for example, the username of the practitioner, the practitioner's chosen password (ideally a mathematical Hash of that password, so the password is not made available at any time in plain-text form while in possession of the supplier), and a randomly generated access code involving or ultimately associated with the practitioner specific data and possibly the chosen prosthesis identification code. There are many possibilities, and persons skilled in that art are well aware of the options available and the risks and vulnerabilities of key creation, selection, storage, transfer and transmission.

Step BBB' is an optional step 110' and involves encrypting the modified file created by step AAA using, by example, AES (Advanced Encryption Standard) having, by way of example only, a 256-bit length key. The TLA Converter tool also has access to the predetermined and respective decryption algorithm and decoding key. The decryption key can be embedded in the third-party software program, for example, TLA Converter tool software, and is only accessible by the TLA Converter tool during decryption and is not readable by any other means. Step BBB' may be layered on top of step BBB or vice versa.

Step CCC, an optional step, involves rotating predetermined characters within the file created by steps AAA or step BBB based on a predetermined seeded string. For example, given a predetermined seed string, add in a sub-step CCCa the ASCII value of the first character of the file created by steps AAA, BBB or CCC or any combination of those steps to the ASCII value of the first character in the file associated with the respective step or combination of steps AAA, BBB and CCC.

The process with step CCC continues by following sub-step CCCa with sub-step CCCb involving the addition of the ASCII value of the second character in the predetermined seed string to the second character in the file associated with the respective step or combination of steps AAA, BBB and CCC. Within step CCC the sub-steps continue until all the values in the predetermined seed string have been used. The predetermined string may need to be fully or partially repeated (folded) to allow the number of values in the predetermined seeded string to be less quantity than the number of characters in the subject file. There could be circumstances where the quantity of values in the predetermined seeded string is the same as the number of characters in the subject file or greater, in which case not all of the predetermined seeded values will be used in the process of step CCC. Once the last value of the seed string has been used, the processing of the various sub-steps of step CCC can be repeated. A predetermination of the seed string can be applied once, or multiple different predeterminations can be used.

Step DDD involves saving the converted, encrypted and formatted file created as a result of optionally performing steps AAA, BBB, BB', and CCC as a specific file type and may have a dedicated file extension. By way of example, a TLT file is useable to display the converted, encrypted and formatted file wherein the software environment is suitable for decrypting and reconstructing the digital data into digital data suitable for the display of a 3-dimensional representation of the object using that TLA file in the TLA animator tool software environment, while not affecting the ability of, in one example, a surgeon observing and possibly manipulate the implant model within the virtual 3-dimensional environment representative of the bone or bones of the patient who is provided by the TLA animator tool software and which is used to display the TLT file in which it is embedded/encapsulated the STL file 114 which is stored in the supplier's computer server until called for by the authorised third party software viewer and manipulation program or in some circumstances of low value or demonstrator models, retrieved from local memory addressable by the TLA animator tool software.

The created TLT file can then and only then be communicated, as per step 116 depicted in the programmatic flow diagram of FIG. 1, from the supplier of the 3-dimensional object definition file with complete confidence that, for example, the embedded STL file they used to create the TLT file and within which there is so much of their intellectual property, is safely embedded in the TLT file format and cannot be extracted but only viewed in the controlled TLA software environment.

However, that will not be possible until the practitioner has received and inserted into a TLA animator tool 'unlock' code 118 (FIG. 1) a separately sent predetermined key-like data. The separate method of communicating the predetermined key, like data, can include Small Message Service (SMS) message sent using the cellular telephony service to the practitioner's mobile phone device, or an email can be used. A predetermination of the key-like data can be applied once, or multiple different predeterminations can be used for the same practitioner or multiple practitioners.

Once the modified prosthesis model is downloaded as a TLT file and ready for use, the modified prosthesis model can be effectively unlocked and usable within the animator tool once the prompt to provide an 'unlock key' is satisfied by the practitioner inserting the predetermined key-like data.

The model of the object cannot be copied by the TLA animator tool software user. Therefore, although a picture of the screen or a screen grab is possible (although the TLA animator tool software can be set to disallow screen grabs), the resulting image would not permit an accurate replication of the object defined in the original 3-dimensional model file in this example an STL format file.

There can be two types of TLT file-a lower-level security TLT file type (for local use in the practitioner's computer device and encapsulated within the TLA software tools) and a higher security TLT file type (for access via a remote computer server 'cloud computing environment' typically the supplier's computer server environment). The STL model modification, and optionally encryption, can be used for the TLT (local file type), but this will only be used for demonstration and use low value or demonstration objects (prosthesis or other objects) and is transformed by the TLA animator tool software using an embedded method. The higher security TLT file type, TLT (cloud), is intended for real-time use requiring at least a username and separately communicated unlock key (not unlike a Two Factor Authentication process), using an authentication code communicated to the registered practitioner in real-time when they wish to use the model in a virtual environment.

FIG. 2 depicts step 116 (described previously) with alternate and additional details regarding the supplier making available an STL file 302. One option, as described above, is the provision of a protected version (see also step c) in FIG. 6) from the supplier's computer server "in the cloud" 304, meaning that with the appropriate computer controls controlled by the computer server, allow the original high-value STL model to be transformed 306 by removing predetermined parts of the file, for example, a part of a binary STL file, thus preventing the STL file from being read by STL reading programs or object printing machines. The transformed STL file is then encrypted 310. A combination of predetermined data, by way of example: the predetermined data may be the user name of the practitioner; a practitioner encrypted but likely not a clear password; a time of, for example, the transaction or an earlier request; a computer device identification associated with the computer being used by the practitioner, etc., and a supplier-generated access code (for example, a 6-digit or digit/character string) can form the seed for creating an encryption key. There may be one or more data as identified used as the seed. Using the seed data, an SHA-2 512-bit length key is created for illustrative purposes. The transformed STL file is then encrypted using, by way of example, the AES (Advanced Encryption Standard) using the created 512-bit length key. The seed string can be stored within the TLA Animator code as an encrypted string. The encryption key can also be stored within the TLA Animator code. The application of an anti-reverse-engineering tool during the code embedding process is intended to make the identification and location of the seed and key impossible or at least highly unlikely. An alternative is to create public and secret keys and string pairs as is known in the art. The encrypted seed string and algorithm will be communicated to STL file suppliers separately via a secure method or methods known to those in the art.

FIG. 2 also depicts when low-value or purely demonstration STL model files are made available from the supplier to a third party to hold within the third party's computer server or embedded within the third party's software product 304'. When the third party has the original STL file of a model, the third-party software is adapted to manipulate the STL file. By way of example, a form of transformation is to perform character rotation based on a predetermined data string. A predetermination of the data string to use can be created once, or multiple different predeterminations can be used.

By way of example only, a character rotation transformation can be performed by taking each character within the STL file and rotating that character (between 0-255) by the ASCII value of a sequential character from a string: e.g. Given a string "ABC": Add ASCII ('A')=65 to the first character of the file, 66 ('B') to the second, 67 ('C') to the third (such that 255+1=0). Then return to the start of the string: i.e. add 65 to the fourth character, 66 to the fifth, etc., Clearly, the longer the string of characters, the harder it is to reverse engineer the transformation.

Only a transformation is performed on the low-value or demonstration STL model file, with no encryption, but encryption can be an option or an optional step. That transformation can be performed by the third-party computer server or within the third-party software program. The value of the STL file of the model may be of low value, but it is still transformed to obfuscate the file and thus make it harder for unauthorised parties to simply use the low value or demonstration STL model file.

The local TLT files (for example) have had each character altered by rotation based on a specified string. These files are only opened and decrypted by the TLA animator tool software and therefore are unrecognisable by other 3D file format programs and cannot be recreated unless the string upon which the character rotation is known-therefore, the original STL file is not present in the TLT file.

The practitioner then manipulates the prosthesis model within the virtual body part model, checking for the appropriate sizing and alignment to replicate the desired geometric restoration or modification of the injured, damaged or degenerated anatomical part. The practitioner will appreciate the desired surgical intervention and aim, so they will use their skills within a suitably manipulative interface to perform virtual surgery before carrying out the intervention on the patient. While such virtual interactions can be performed within a controlled online interface within the prosthesis supplier's computer environment, the ability to perform virtual viewing, manipulation and possibly also virtual surgery using the practitioner's own computer at a time convenient to them has a significant advantage with respect to convenience to the practitioner, the time taken by the practitioner to consider a large number of possibilities and in respect to the control of patient data which does not have to leave the control of the practitioner's practice, as well as avoiding the cost of third-party computer graphics operators and intermediaries. One such interactive environment would be the TLA animator tool software, designed to virtually mimic the workflow and tools as seen in a physical surgical intervention performed by the practitioner.

Figure 3:
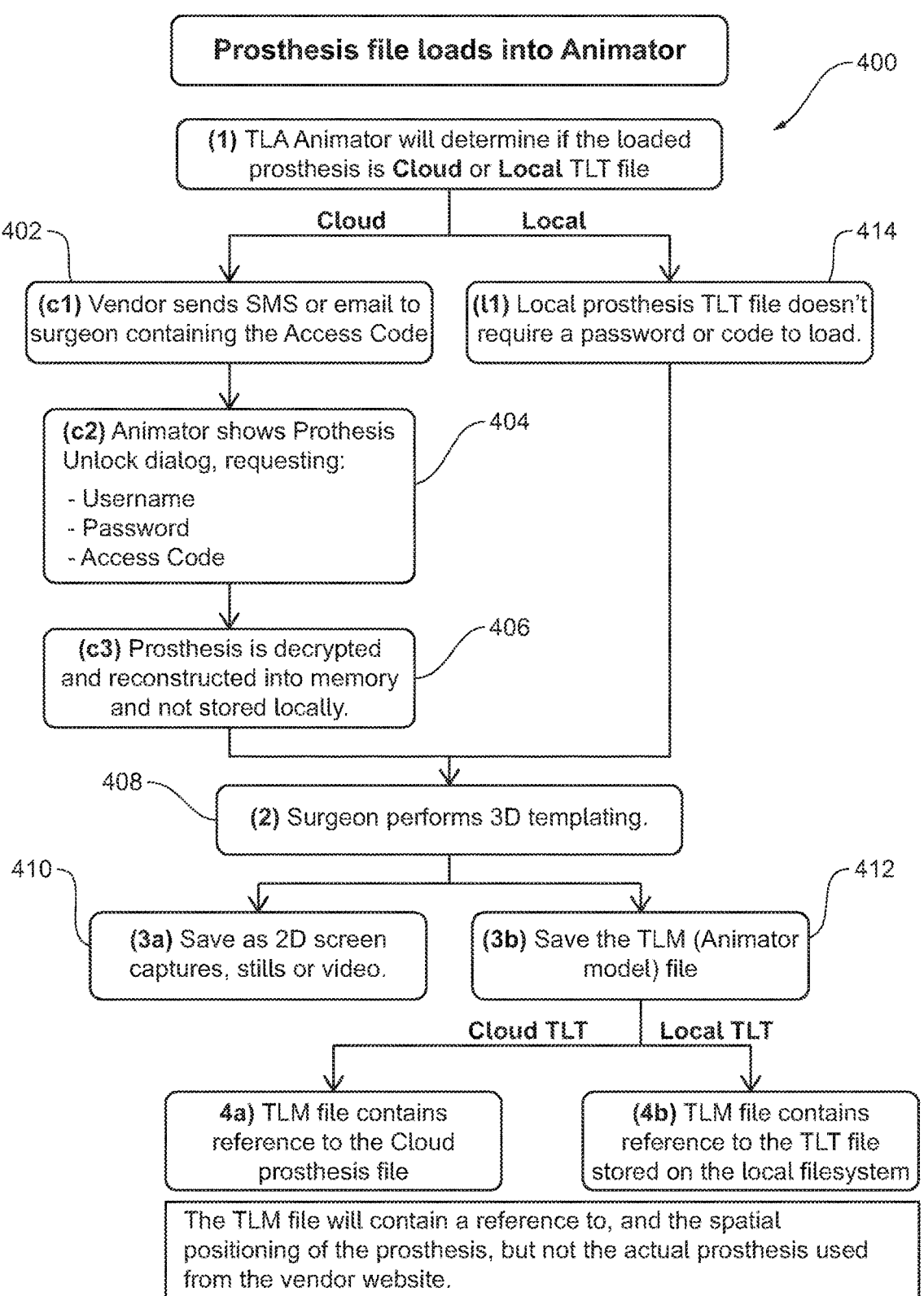
FIG. 3 is a flow diagram of the preferred and optional steps in the process of sending and using the transformed and non-distributable TLT file in an animation environment.

FIG. 3 depicts an embodiment of the steps involved in loading a transformed TLT file into the TLA animator tool software, as does FIG. 7, which includes more detail about the interaction of the practitioner (surgeon in FIG. 7) with the supplier's website but which is also similar to the steps described in regards to FIG. 3.

Step 400 involves the TLA animator tool software determining if the transformed STL file, referred to as a TLT file, is a cloud-based or Local file and then performing the step. The computer processor on which the software is executing is thereby specifically adapted to perform the disclosed method for making available the converted and encrypted digital data file in the predetermined file format (TLT).

For a cloud-based file, the supplier/vendor provides 402 from their computer server an 'access code' to the practitioner using a convenient communications path, such as SMS or email, to unlock access to the previously selected transformed STL file model, as illustrated in FIG. 8. After that step, the supplier (vendor in FIG. 8) prepares and returns to the TLA Animator program used by the practitioner a file download link, as depicted in FIG. 8. This is done in real-time when the practitioner wishes to view the model within a patient-specific 3-dimensional virtual display. Since this process is done in real-time and does not require human intervention, it can be done when it best suits the practitioner, which may be late at night or early morning or while a patient awaits emergency surgery and the practitioner wants to inspect the virtual environment first.

Step 404 involves displaying from within the TLA animator tool software program an unlock dialogue window which requires the practitioner to enter a username, a password and the previously described and provided 'access code'.

Step 406 involves decrypting the file after receiving the transformed and encrypted STL file as a TLT file. The system for displaying a 3-dimensional representation of an object includes a computer processor specifically adapted to perform the embodiment of the method disclosed herein and includes a TLA Converter tool that also has access to the predetermined and respective decryption algorithm and decoding key. In this embodiment, the decryption algorithm used is the same AES (Advanced Encryption Standard) key used to encrypt, having, by way of example, only a 512-bit length key. The TLA software generates the key as it knows the makeup of the seed for the key using the SHA-2 generator. These processes are embedded in the TLA Converter software and only accessible by the TLA Generator or Animator and are not readable by any other means. The decrypted model file is then also useable and not stored other than in Random Access Memory to superimpose the 3-dimensional prosthesis model into the virtual model of the part or parts of the patient.

Step 406 involves re-inserting predetermined recurring elements removed in the earlier removing step, which were optionally removed to aid in obfuscation. The model of the prosthesis may still be useable within the TLA animator tool software if one or more of the recurring elements are not re-inserted.

In step 408, the practitioner can view and manipulate the prosthesis model in the animated environment provided. The TLA animator tool software allows for the saving 410 (storage) of 2-dimensional images and the saving 412 (storage) of an animator model file which shows the superimposed objects (the prosthesis and the bone or part of the body) from multiple views. Thus, the saved views can be shared with colleagues and the patient.

The image-generating arrangement (which is part of a system for displaying a 3-dimensional representation of an object) receives the converted and encrypted digital data file (TLT digital data file) and decrypts and reconstructs the 3-dimensional representation of the object, and displays the object integrated with other objects within a software environment such that the object is visible to the user of the software. The user cannot replicate the 3-dimensional model in any format sufficient to create the equivalent of the 3-dimensional model in any physical or virtual form external to the immediate viewing environment.

However, in the case of a locally held transformed STL model file, step 414, the file does not need a password or access code to be loaded into the TLA animator tool software.

Once the practitioner is as confident as they can be that the selected prosthesis is appropriate for the task at hand, the supplier can be notified from within the TLA software, or the practitioner can be sent the file reference provided with the transformed STL file back to the supplier, and that will form a part of an order process between the practitioner and the supplier. All of the described steps and processes are done at a time convenient to the practitioner (the customer) while the security of the STL model is maintained. The practitioner is less likely to order multiple prostheses using the disclosed arrangement. Thus, the purchase process will be cost-effective for the purchaser which may be the practitioner or the purchasing department of the partitioner's health institution or insurance company. The described process aids the efficient use of the practitioner's time and the suppliers' resources and time.

If different sizes of the same prosthesis are required for the virtual assessment process, they can also be generated by the supplier and made available for download. Each different size is treated as a separate prosthesis model, so the steps described previously are repeated for each choice of a single prosthesis before it is made available as a TLT file for download. In keeping with the need to securely deal with each TLT file, each download is associated with unique unlocking data, which will be sent via suitable communication to the registered practitioner. There can be a limitation imposed by the TLA software allowing one prosthesis model to manipulate at a time by a practitioner, or there may be the ability to allow two or more prostheses models to be manipulated by the practitioner at the same time, using the TLA animator tool or other TLA software tools.

Figure 4:
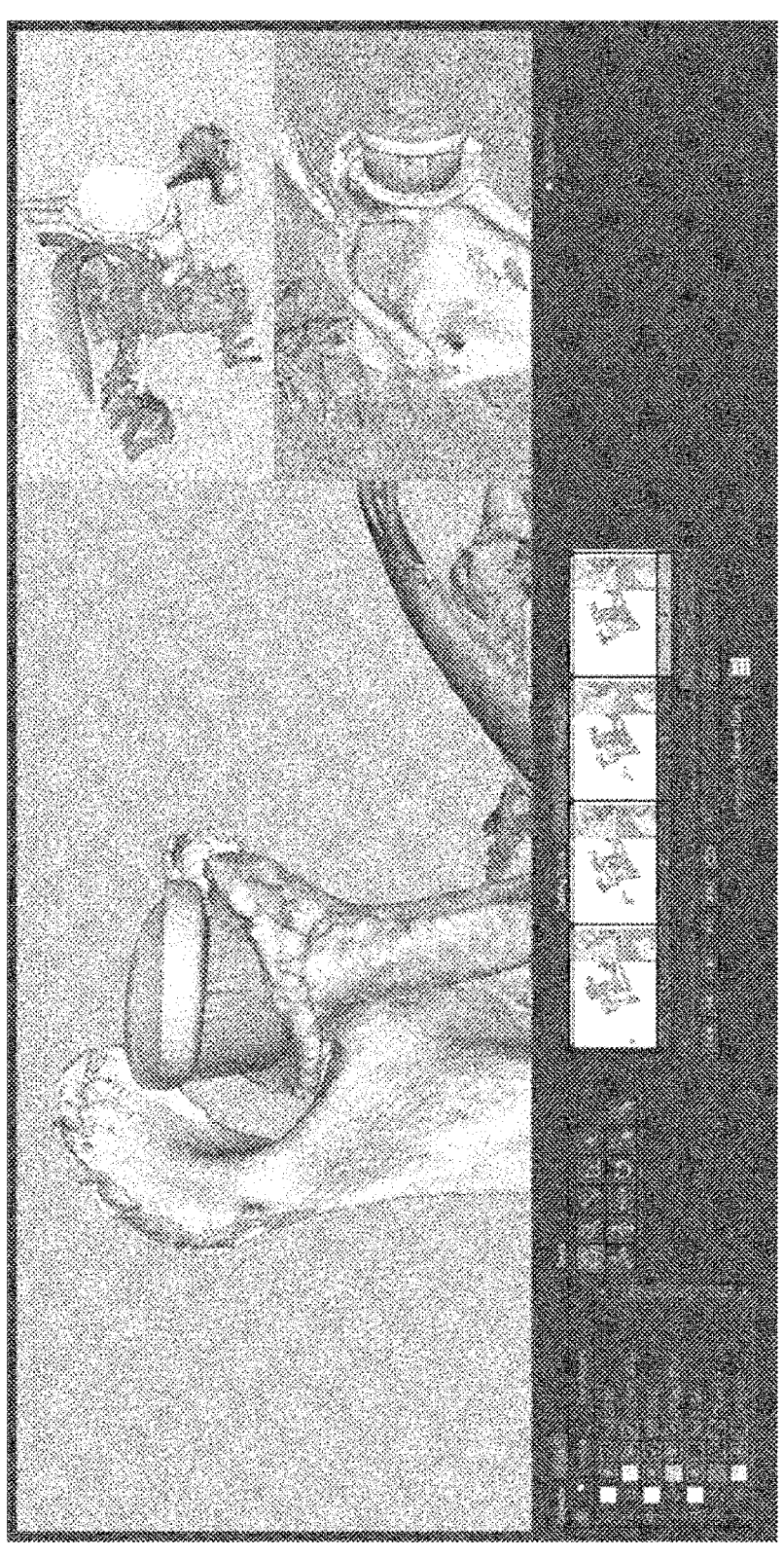
FIG. 4 is an image of a shoulder with an abnormal shape due to arthritis which shows the deformed scapula (glenoid) with a corrective wedges device, plus the articulating plastic glenoid component of the arthroplasty in an interactive interface as part of a virtual surgical task planning process.

FIG. 4 is an example of a virtual prosthesis model being displayed in a virtual model of the specific part of a patient. The virtual bone model depicted is a scapula with an abnormal-shaped glenoid due to arthritis. There is a requirement to trial a range of possible devices that will address the deformity to allow for the performance of a more effective arthroplasty procedure. The image shows the deformed scapula (glenoid) with both the corrective wedges devices plus the articulating plastic glenoid component of the arthroplasty in an interactive interface. The surgery can be planned, the desired and optimum position defined, and the procedure trialled in a virtual environment before performing an actual procedure.

The following claims are provided as examples of possible claims. They are not intended to limit the scope of what may be claimed in future patent applications based on the proper disclosure in the present application. Integers may be added to or omitted from the claims later to further define or redefine the scope.

The invention claimed is:

1. A method of protecting a digital data file containing a 3-dimensional representation of an object from unauthorized distribution comprising:

converting the digital data file representative the object by modifying the digital data file based on a seed string to create a converted digital data file;

encrypting the converted digital data file using an encryption algorithm and encoding key to create an encrypted converted digital data file having a file format; and making available the encrypted converted digital data file in the file format to a software environment, wherein the software environment in operation is suitable for decrypting the encrypted converted digital data and generating from the converted digital data file a temporary digital data file resident only in volatile memory to allow display of the 3-dimensional representation of the object solely within the operating software environment.

2. The method, according to claim 1, wherein the digital data file is a Standard Tessellation Language formatted digital data file.

3. The method, according to claim 2, wherein the Standard Tessellation Language formatted digital data file includes data representative of one or more of the: resolution, angle control, chordal deviation, binary or ASCII format, vertex-to-vertex rules, orientation rules, and an all-positive rule of data representative of the object.

4. The method, according to claim 1, wherein modifying the digital data file based on a seed string to create the converted digital data file comprises:

removing data from the digital data file based on the seed string.

5. The method, according to claim 4, wherein removing data from the digital data file based on the seed string comprises;

for one or more characters in the seed string, removing data from the digital data file corresponding to the one or more characters; and providing an indication in the digital data file from where in the digital data file the data was removed.

6. The method, according to claim 1, wherein modifying predetermined parts of the digital data file based on the seed string to create comprises:

adding bytewise subsequent characters in the seed string to subsequent bytes in the digital data file to form modified bytes in the converted digital data file.

7. The method, according to claim 6, further comprising:

on finishing the seed string returning to a beginning of the seed string and continuing to bytewise add subsequent characters in the seed string to subsequent bytes in the digital data file.

8. A system for displaying a digital data file containing a 3-dimensional representation of an object comprising:

a computer processor specifically adapted to:

receive an encrypted converted digital data file having a file format, wherein the encrypted converted digital data file is generated from the digital data file which has been initially converted to a converted digital data by modifying the digital data file based on a seed string, and then subsequently encrypting the converted digital data using an encryption algorithm and encoding key to create the encrypted converted digital data file; and making available the encrypted converted digital data file in the file format to a software environment, wherein the software environment in operation is suitable for decrypting the encrypted converted digital data and generating from the converted digital data file a temporary digital data file resident only in volatile memory within the operating software environment; and an image-generating arrangement to process the temporary digital data file and display the object integrated with other objects solely within the operating software environment, wherein the object is visible to the user of the operating software environment and the user cannot create a digital equivalent of the 3-dimensional representation of the object in any physical or virtual form external to the operating software environment.

9. The system, according to claim 8, wherein the digital data file is a Standard Tessellation Language formatted digital data file.

10. The system, according to claim 9, wherein the Standard Tessellation Language formatted digital data file includes data representative of one or more of the: resolution, angle control, chordal deviation, binary or ASCII format, vertex-to-vertex rules, orientation rules, and an all-positive rule of data representative of the object.

11. The system, according to claim 8, wherein modifying the digital data file based on a seed string to create the converted digital data file comprises:

removing data from the digital data file based on the seed string.

12. The system, according to claim 11, wherein removing data from the digital data file based on the seed string comprises:

for one or more characters in the seed string, removing data from the digital data file corresponding to the one or more characters; and providing an indication in the digital data file from where in the digital data file the data was removed.

13. The system, according to claim 8, wherein modifying predetermined parts of the digital data file based on the seed string to create comprises:

adding bytewise subsequent characters in the seed string to subsequent bytes in the digital data file to form modified bytes in the converted digital data file.

14. The system, according to claim 13, further comprising:

on finishing the seed string returning to a beginning of the seed string and continuing to bytewise add subsequent characters in the seed string to subsequent bytes in the digital data file.

* * * * *